J. M. Chaplin,
Potato Washer,
Nº 76,399. Patented Apr. 7, 1868.

Witnesses:
E. D. Mayhew
D. H. Hickett

Inventor:
Jos. M. Chaplin
By his atty.
J. F. Reigart

United States Patent Office.

JOSEPH M. CHAPLIN, OF MORRISVILLE, VERMONT, ASSIGNOR TO HIMSELF, E. E. ALLEN, AND F. M. LOVELAND.

Letters Patent No. 76,399, dated April 7, 1868.

IMPROVED POTATO-WASHER AND PAN COMBINED.

*The Schedule referred to in these Letters Patent and making part of the same.*

TO ALL WHOM IT MAY CONCERN:

Be it known that I, JOSEPH M. CHAPLIN, of Morrisville, Lamoille county, and State of Vermont, have invented Improvements in Tin Potato-Washer and Tin Pan Combined; and I hereby declare the following to be an exact description thereof, reference being had to the accompanying drawings, and to the letters of reference marked thereon, making a part of this specification.

Figure 1:
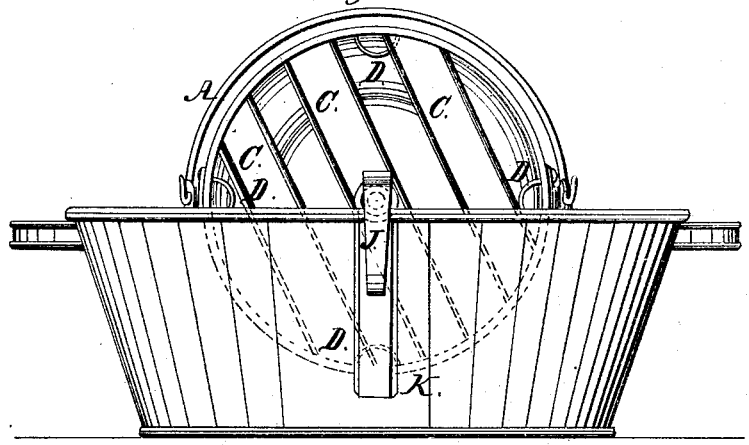

Figure 1 represents an elevation of the machine.

Figure 2:
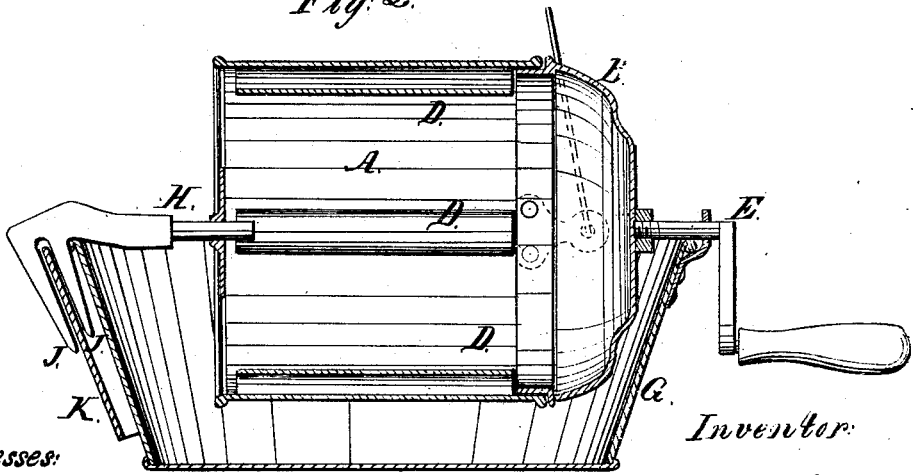

Figure 2, a cross-section.

A represents the potato-washer, cylindrical-shaped, with a lid, B, at the top, and cross-bars, C C, at the bottom. D D are half-round floats, attached to the inside of the cylinder, four or more in number, for the purpose of scattering the potatoes as the cylinder A is revolved. The cylinder A has a crank, E, at one end, that rests on the edge of the pan G. The other end of the cylinder A is supported by a journal, H, with the double hooked ends J J. The journal H is movable, and is passed into an aperture in the centre bar C, in the bottom of the cylinder. The hooked end of journal H rests in a tube, K, at the side of the pan G, and the cylinder is thus suspended and revolved on the top edge of the pan. The crank, E, is attached to the top of the lid B by a screw-nut.

What I claim as my invention, and desire to secure by Letters Patent, is—

The cylindrical potato-washer A, with its bars C C and movable hooked journal H in the one end, and lid B and crank E at the other end, when constructed and combined with the tin pan G, as herein described, and for the purpose set forth.

JOS. M. CHAPLIN.

Witnesses:
 JOHN WEST.
 J. L. COLLINS.